(12) United States Patent
Richter

(10) Patent No.: US 6,532,979 B1
(45) Date of Patent: Mar. 18, 2003

(54) RESIDENTIAL WATER DAMAGE PREVENTION SYSTEM

(76) Inventor: Kris Richter, 1222 Summit Crest, San Antonio, TX (US) 78258

( * ) Notice: Subject to any disclaimer, the term of this patent is extended or adjusted under 35 U.S.C. 154(b) by 0 days.

(21) Appl. No.: 10/023,439

(22) Filed: Dec. 13, 2001

(51) Int. Cl.[7] .............................. E03B 7/00; F16K 31/02
(52) U.S. Cl. .................. 137/1; 137/624.11; 251/129.04
(58) Field of Search ........................ 137/624.11, 624.12, 137/357, 1; 251/129.04; 239/70

(56) References Cited

U.S. PATENT DOCUMENTS 5,568,825 A * 10/1996 Faulk .................... 137/624.11
5,921,270 A * 7/1999 McCarty ............ 251/129.04 X
6,237,618 B1 * 5/2001 Kushner ............ 137/624.11 X

* cited by examiner

Primary Examiner—Kevin Lee
(74) Attorney, Agent, or Firm—Wayne J. Colton, Inc

(57) ABSTRACT

A residential water supply interruption system generally comprises a remotely controllable shut-off valve and a controller in communication with the remotely controllable shutoff valve. The remotely controllable shutoff valve is interposed a water line from a water main to the living quarters portion of a residential building, such that activation of the shutoff valve operates to prevent flow of water from the water main to the living quarters. In this manner, damage to the living quarters from failure of water pipes running through the living quarters is prevented during times that the shutoff valve is activated.

22 Claims, 1 Drawing Sheet

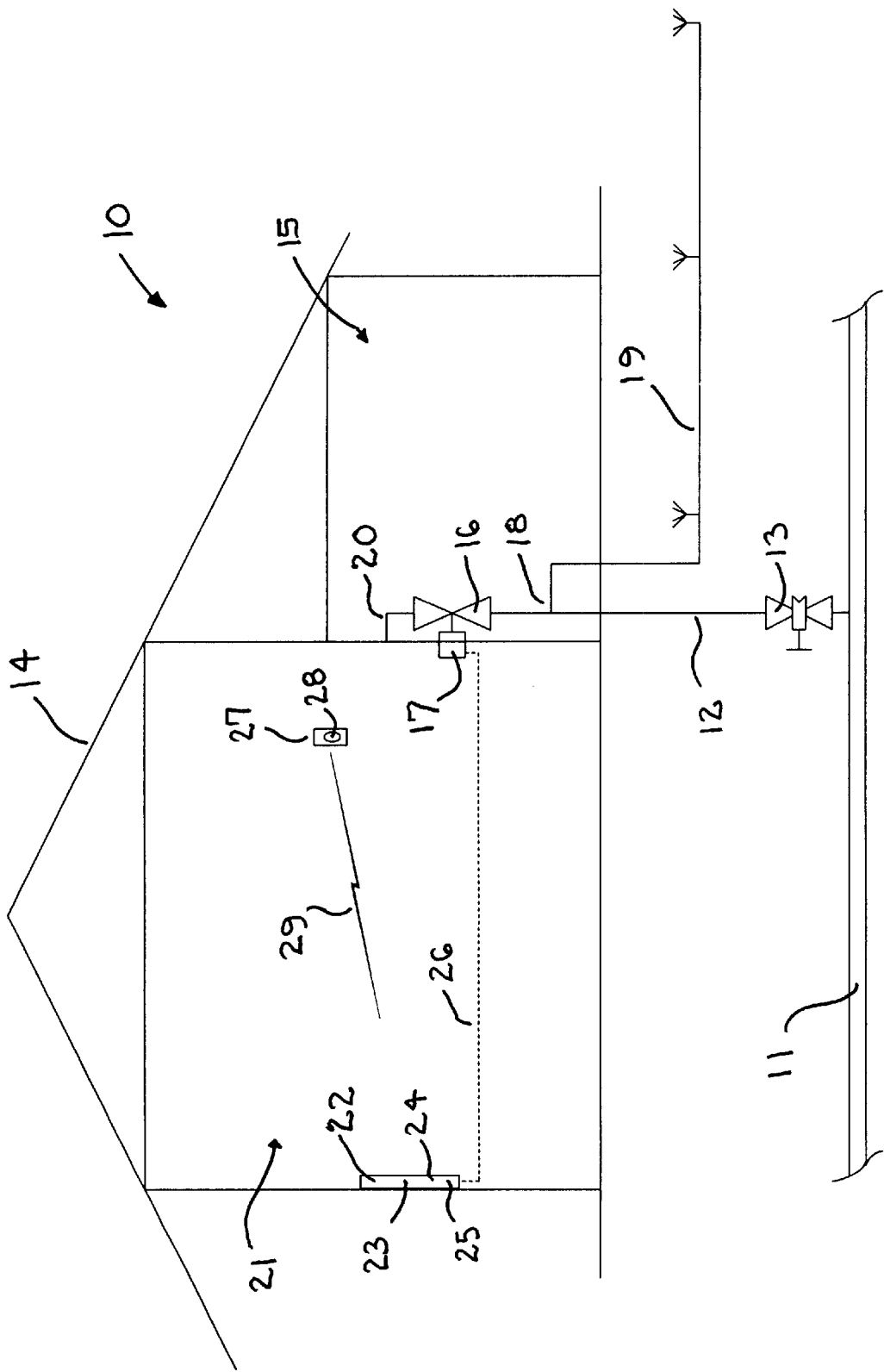

RESIDENTIAL WATER DAMAGE PREVENTION SYSTEM

FIELD OF THE INVENTION

The present invention relates to plumbing systems. More particularly, the invention relates to a system whereby water related residential damages may be reduced or eliminated by selectively disrupting flow of water into the residence.

BACKGROUND OF THE INVENTION

Losses to residential property owners incident damages caused by broken water pipes are staggering. In part because broken water pipes often go undetected in the absence of the property owner or while the property owner sleeps through the night, water damage from a broken water pipe can be catastrophic. In fact, some insurance agencies report that up to seventy percent of their insurance losses are water related.

It is therefore an overriding object of the present invention to improve upon the prior art by providing a system whereby residential property owners may easily protect themselves against catastrophic damages caused by broken water pipes. Additionally, it is an object of the present invention to provide such a system that may be operated manually or automatically. Finally, it is an object of the present invention to provide such a system that is economical to implement and reliable in operation.

SUMMARY OF THE INVENTION

In accordance with the foregoing objects, the present invention—a residential water supply interruption system—generally comprises a remotely controllable shut-off valve and a controller in communication with the remotely controllable shutoff valve. The remotely controllable shutoff valve is interposed a water line from a water main to the living quarters portion of a residential building, such that activation of the shutoff valve operates to prevent flow of water from the water main to the living quarters. In this manner, damage to the living quarters from failure of water pipes running through the living quarters is prevented during times that the shutoff valve is activated.

To easily activate the remotely controllable shutoff valve, the controller preferably comprises an electric switch, which may be conveniently located within the living quarters at, for example, an entrance doorway. The switch, in turn, is in communication with actuator, such as a motor or solenoid mechanism, operably collocated with the shutoff valve. In this manner, occupants may simply flip the switch on the way out of the residential building, thereby causing the flow of water into the living quarters to be blocked. In an extension of the present invention, the controller may also be provided with a timer for automatically operating the switch according to a user-defined schedule. In this embodiment, the timer may automatically cause disruption of water flow into the residential quarters at times that occupants are normally expected to be absent or normally expected to not require water such as, for example, during the nighttime hours. In the latter case, it is preferable that the controller be provided with an override, which may be remotely operable through a radio link, to allow temporary water flow as required for the single flushing of a toilet or the like.

Although those of ordinary skill in the art will recognize many substantial equivalents, the remotely controllable shutoff valve may comprise a ball valve operable via and electric motor or a gate valve operable via a solenoid mechanism. In either case, it is preferable that the valve actuator be operable at the same voltage levels as commonly utilized in automated sprinkler system controllers. In this manner, the shutoff valve may be easily located in the garage area of the residential building adjacent to the junction to the sprinkler system. As will be apparent to those of ordinary skill in the art, especially in light of this exemplary description, this arrangement allows the shutoff valve to be utilized to protect the residential quarters without interference with the operation of an automatic sprinkler system.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein the FIGURE shows, in functional block diagram, the preferred embodiment of the water safety system of the present invention as implemented in a residential building.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figure, the water safety system 10 of the present invention is shown to generally comprise a remotely controllable shut off valve 16 strategically placed between a main supply line 12 from a water main 11 and a household water supply line 20 to a residential building 14. The remotely controllable shutoff valve 16 is operated by a controller 22 to selectively prevent flow of water through the household water supply line 20. In the preferred embodiment of the present invention, the remotely controllable shut off valve 16 is located with respect to the household water supply line 20 such that water flow through the household water supply line 20 to the living quarters portion 21 of the residential building 14 may be prevented while still allowing water flow to non-residential areas, such as to sprinkler lines 19. To this end, the remotely controllable shut off valve 16 is preferably interposed any sprinkler junction 18 and the household water supply line 20 leading to the living quarters 21. In this manner, water may still flow through the main supply line 12 from the water main 11 to the sprinkler lines 19 even though the remotely controllable shut off valve 16 is activated to prevent water flow through the household water supply line 20 into the living quarters 21.

The controller 22, which is preferably located within the living quarters portion 21 of the residential building 14 adjacent an entry doorway, may comprise a simple switch 23 in electrical communication through a communication link 26 with a valve actuator 17, such as an electric motor or solenoid mechanism, for the remotely controllable shutoff valve 16. In this manner, the a residential occupant may simply flip the switch on the way out of the building 14, thereby easily isolating the living quarters 21 from the main supply line 12 without the burden of shutting off the main supply line 12 at the main water shutoff valve 13 from the water main 10 and without interference with the flow of water to nonresidential uses.

In the preferred embodiment of the present invention, the controller 22 is provided with a timer 24 for operation of the switch 23 according to a user defined time schedule. In this manner, the occupant may simply establish that the water supply to the living quarters 21 will be blocked during working hours and/or during sleeping hours. In this embodiment, however, a temporary override 25 may be provided within the controller 22 such that a portable controller 27 may be utilized to enable temporary water flow at the press of a button 28. As will be appreciated by those of ordinary skill in the art, this feature allows the system 10 to protect the living quarters 16 at nighttime, but allows an occupant to have temporary access to water flow when thirsty or needing to flush a toilet. Those of ordinary skill in the art will also recognize that this feature is most preferably implemented through a radio link 29 between the portable controller 27 and the controller 22.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that the remotely controllable shutoff valve 16 is conveniently located in a garage area 15 of the residential building adjacent the junction 18 to an automatic sprinkler system 19. In such an implementation, the valve actuator 17 is preferably adapted to operate at the same voltage level as required for the sprinkler system 19. In this manner, the necessity for a separate low voltage power supply may be eliminated by utilization of the power supply provided for the sprinkler system's controller. In any case, because the scope of the present invention is much broader than any particular embodiment, the foregoing detailed description should not be construed as a limitation of the scope of the present invention, which is limited only by the claims appended hereto.

What is claimed is:

1. A residential water supply interruption system, said system comprising:
    a remotely controllable shutoff valve interposed a water line from a water main to a portion of a residential building, said remotely controllable shutoff valve being located in a garage area of said residential building;
    a controller comprising an electrical switch in communication with said remotely controllable shutoff valve, said controller being adapted to selectively prevent flow of water through said water line to said portion of said residential building, and
    wherein said remotely controllable shutoff valve is interposed a sprinkler system and a household water supply line such that operation of said sprinkler system is independent of the state of said remotely controllable shutoff valve.

2. The residential water supply interruption system as recited in claim 1, wherein said controller further comprises a timer, said timer being adapted to actuate said switch.

3. The residential water supply interruption system as recited in claim 2, wherein said controller further comprises a temporary override, said temporary override being adapted to operate said switch such that flow of water through said water line to said portion of said residential building is enabled for a limited period of time.

4. The residential water supply interruption system as recited in claim 3, said system further comprising a portable controller adapted to enable said temporary override.

5. The residential water supply interruption system as recited in claim 4, wherein said portable controller is in communication with said controller via a radio signal.

6. The residential water supply interruption system as recited in claim 1, wherein said remotely controllable shutoff valve comprises a ball valve operable via an electric motor.

7. The residential water supply interruption system as recited in claim 1, wherein said remotely controllable shutoff valve comprises a gate valve operable via a solenoid mechanism.

8. A residential water supply interruption system, said system comprising:
    a remotely controllable shutoff valve interposed a water line from a water main to a portion of a residential building, said remotely controllable shutoff valve being located in a garage area of said residential building; and
    a controller comprising an electrical switch in communication with said remotely controllable shutoff valve, said controller being adapted to selectively prevent flow of water through said water line to said portion of said residential building.

9. The residential water supply interruption system as recited in claim 8, wherein said portion of said residential building comprises living quarters.

10. The residential water supply interruption system as recited in claim 9, wherein said controller is located within said living quarters.

11. A method for protecting a residential building from damage incident water pipe failure, said method comprising the steps of:
    providing a remotely controllable shutoff valve in a water supply line to at least a portion of the residential building, said portion of the residential building comprising living quarters;
    activating a controller in communication with said shutoff valve to selectively inhibit flow of water through said water supply line; and
    wherein:
        said controller comprises an electrical switch, said switch being adapted to effect control over said shutoff valve, and a timer, said timer being adapted to actuate said switch; and
        said shutoff valve is interposed a first portion of said water supply line entering said living quarters and a second portion of said water supply line in fluid communication with a sprinkler system.

12. The method for protecting a residential building from damage incident water pipe failure as recited in claim 11, wherein said controller further comprises a timer, said timer being adapted to actuate said switch.

13. The method for protecting a residential building from damage incident water pipe failure as recited in claim 11, wherein said shutoff valve comprises a ball valve operable via an electric motor.

14. The method for protecting a residential building from damage incident water pipe failure as recited in claim 11, wherein said shutoff valve comprises a gate valve operable via a solenoid mechanism.

15. A residential water supply interruption system, said system comprising:
    a remotely controllable shutoff valve interposed a water line from a water main to a portion of a residential building;

a controller in communication with said remotely controllable shutoff valve, said controller being adapted to selectively prevent flow of water through said water line to said portion of said residential building; and wherein said remotely controllable shutoff valve is interposed a sprinkler system and a household water supply line such that operation of said sprinkler system is independent of the state of said remotely controllable shutoff valve.

16. The residential water supply interruption system as recited in claim 15, wherein said controller comprises an electrical switch.

17. The residential water supply interruption system as recited in claim 16, wherein said controller further comprises a timer, said timer being adapted to actuate said switch.

18. The residential water supply interruption system as recited in claim 17, wherein said controller further comprises a temporary override, said temporary override being adapted to operate said switch such that flow of water through said water line to said portion of said residential building is enabled for a limited period of time.

19. The residential water supply interruption system as recited in claim 18, said system further comprising a portable controller adapted to enable said temporary override.

20. The residential water supply interruption system as recited in claim 19, wherein said portable controller is in communication with said controller via a radio signal.

21. The residential water supply interruption system as recited in claim 16, wherein said remotely controllable shutoff valve comprises a ball valve operable via an electric motor.

22. The residential water supply interruption system as recited in claim 16, wherein said remotely controllable shutoff valve comprises a gate valve operable via a solenoid mechanism.

* * * * *